Oct. 4, 1949.     H. B. BABSON     2,483,516
SUPPORTING ARRANGEMENT FOR MILKERS
Filed Jan. 19, 1944     2 Sheets-Sheet 1
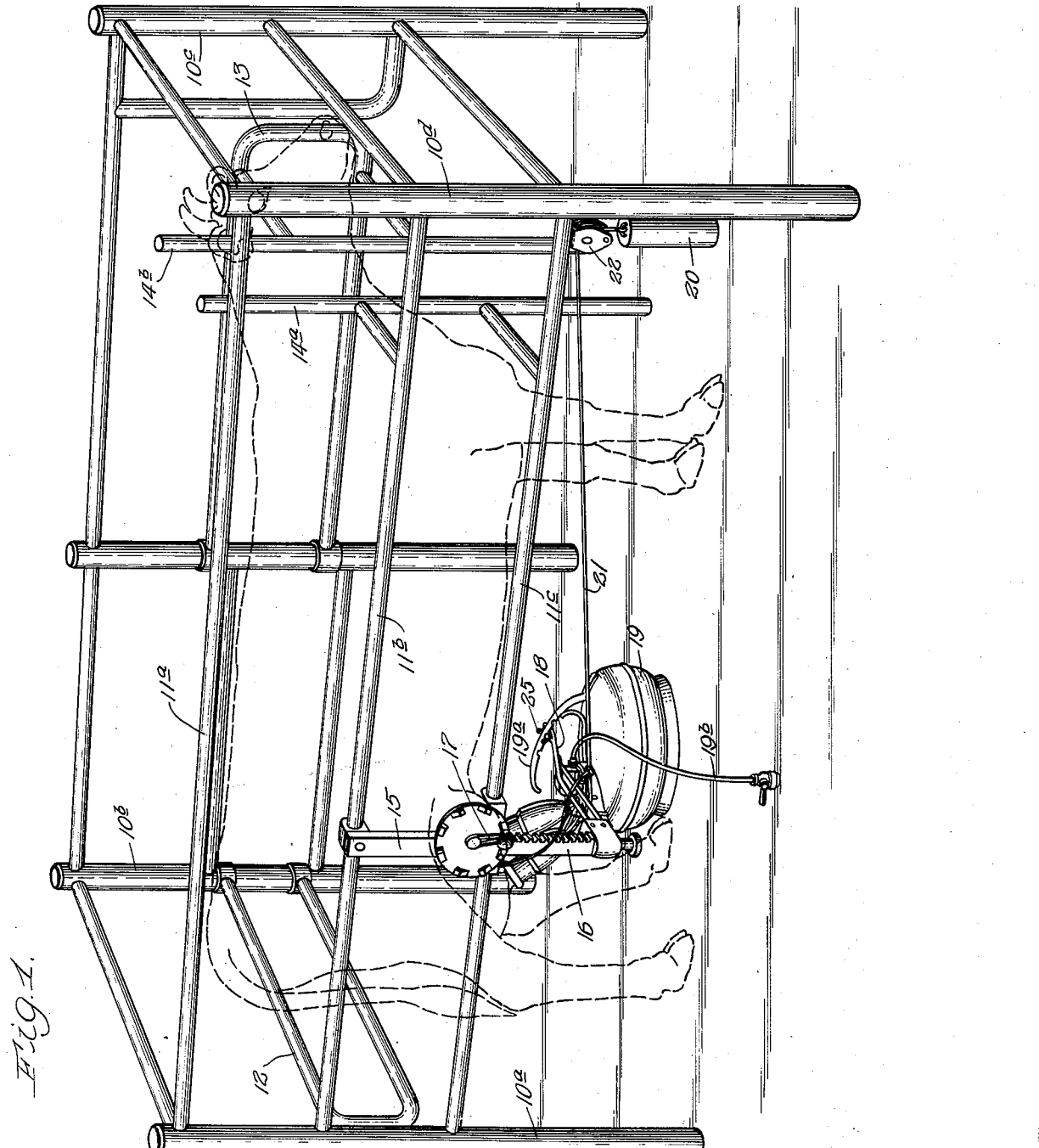

Oct. 4, 1949.   H. B. BABSON   2,483,516
SUPPORTING ARRANGEMENT FOR MILKERS
Filed Jan. 19, 1944   2 Sheets-Sheet 2
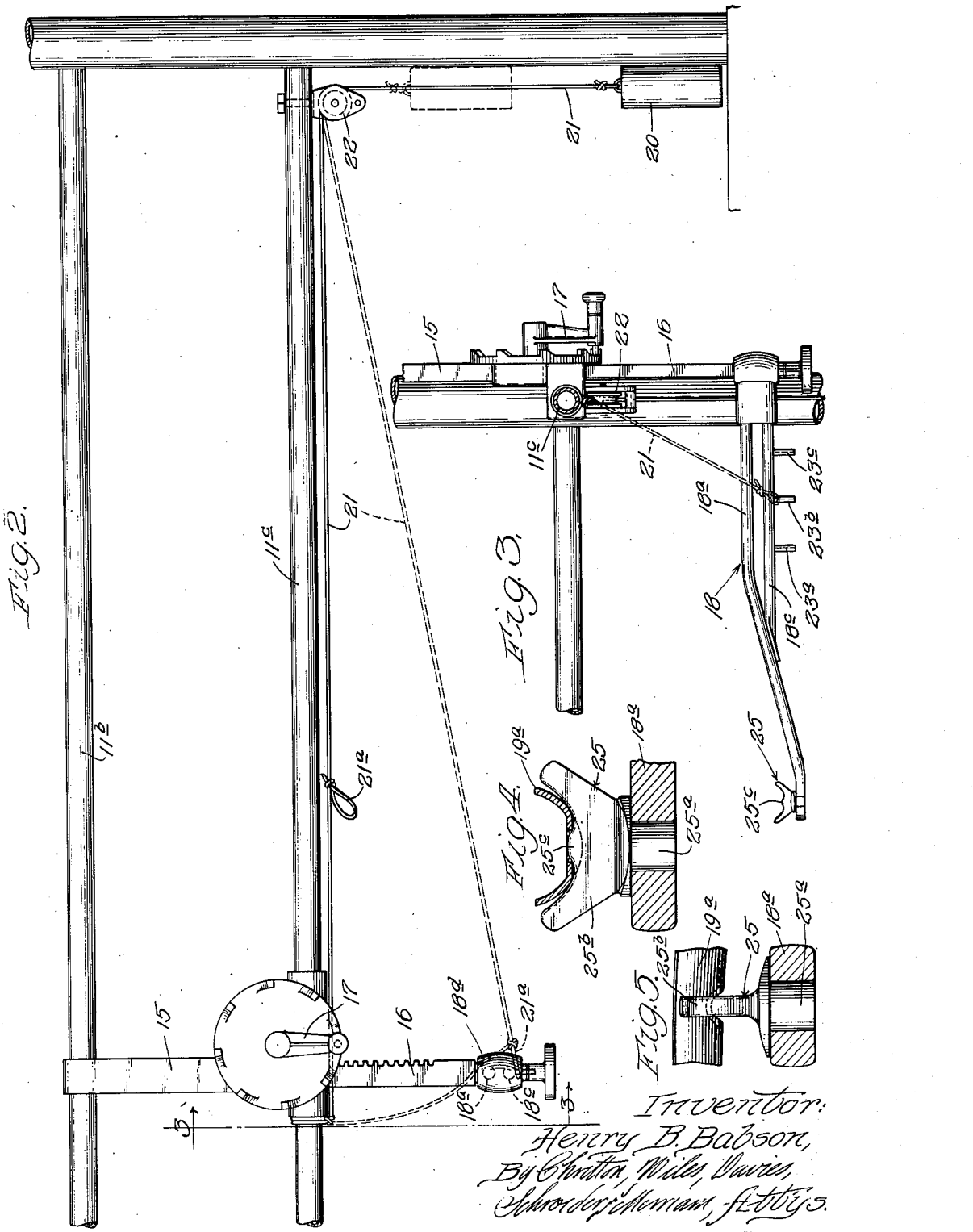

Patented Oct. 4, 1949

2,483,516

UNITED STATES PATENT OFFICE 2,483,516

SUPPORTING ARRANGEMENT FOR MILKERS

Henry B. Babson, Chicago, Ill., assignor to Babson Bros. Co., a corporation of Illinois Application January 19, 1944, Serial No. 518,798

8 Claims. (Cl. 31—58)

1

This invention relates to a supporting arrangement for milkers, and more particularly suspended milkers.

The present invention is an improvement in supporting apparatus of the kind shown in the Reissue Patent 22,368 of one Jacob J. Stampen and myself, which issued August 24, 1943, as a reissue of our original patent No. 2,136,228 of November 8, 1938.

One feature of this invention is that it provides improved means for supporting a milker in desired position with respect to the animal being milked; another feature of this invention is the provision of means for urging the milker forwardly of the animal and away from the udder, to provide a desired pull on the udder during milking; still another feature of this invention is that the means developing such pull maintains a substantially unvarying pull force despite variations in the position of the animal and of the milker-carrying portion of the supporting member; yet another feature of this invention is the provision of simple and readily operable means for adjusting or varying the amount of pull; and a further feature of this invention is the provision of a pivoted milker-carrying member on the supporting means. Other features and advantages of this invention will be apparent from the following specification and the drawings, in which:

Figure 1 is an elevational view of a parlor stall with supporting apparatus embodying my invention, the supporting apparatus being shown carrying a milker in operative relation to the position of a cow, indicated in dotted lines within the stall; Figure 2 is an enlarged partial side view of the supporting apparatus; Figure 3 is a fragmentary transverse view, partially in section, along the line 3—3 of Figure 2; Figure 4 is a detail view, partly in section, of the pivoted milker-carrying member; and Figure 5 is a detail view transverse to that of Figure 4.

Suspended milkers have a number of advantages over other types of machines for milking cows, and a large proportion of the milkers now being commercially sold are of the suspended type. Such a milker comprises, as its principal parts, a bucket, a lid, a pulsator, four teat cups, and the rubber inflations and tubes necessary to render the combination operative; and the entire combination is suspended beneath the belly of the cow, slightly forward and below the udder to which the teat cups are connected. Such a milker will not be described more fully here since it is well known and in commercial use. Reference may be had to McCornack Patent No. 1,859,213 of May 17, 1932, and to other issued patents, for a more complete description of such suspended milkers and of the way in which they are conventionally supported.

2

It has long been customary to support such milkers beneath the cow by an arrangement which comprises a surcingle strap thrown across the back of the cow and having its ends hanging down on each side of the cow, and a carrying member in the form of a spring steel rod extending across from one side to the other beneath the belly of the cow, such a suspension being shown in the above-mentioned McCornack patent. For some years now, however, many of the better dairies have done their milking in milking parlors, the cows being brought from their regular stalls in the barn to stalls in the parlor at milking time. When the milking is done by this method, it is desirable to avoid the necessity of putting a surcingle on and off each cow as it is milked, and to have the milker supporting member mounted on some stationary element (as distinguished from the back of the cow), as one of the side bars of the parlor stall, spring supporting elements mounted in the flooring, or the like. While this is spoken of as a stationary element, it will be understood that it may be vertically or horizontally adjustable, but that it is fixed and stationary during milking of any given cow, all movement being by the swinging arm or supporting member carrying the milker. A swinging arm supporting arrangement extending in from one side of the stall is shown in the re-issue patent mentioned above, the construction of the supporting arrangement which is the subject matter of this patent being substantially the same, the difference between this and such earlier re-issue patent lying primarily in the manner for exerting force on the supporting member to provide the desired forward pull of the milker, and in the provision of a pivoted milker-carrying member at the end of the swinging arm.

Referring now more particularly to the embodiment of my invention illustrated in the drawings, a parlor stall is shown as comprising four main corner posts 10a—d connected by longitudinal and transverse rod members, the longitudinal rod members on the side of the stall facing the operator of this parlor being here identified as 11a—c. While other gate arrangements may be used, the back end of the stall is here shown as provided with an entrance gate 12 adapted to be swung open to permit the cow to enter the stall and a side of the stall is provided with an exit gate 13 adapted to be opened to permit the cow to leave the stall after milking. Stanchion members 14a and 14b are provided, the stanchion member 14b being mounted on and movable with the gate 13. After one cow has been let out of the stall, the gate is opened and the next cow driven in until her neck is in juxtaposition with the stanchion member 14a whereupon the gate 13 is closed and locked by any appropriate means (generally levers and overhead linkage, as shown in my Patent 2,198,048, for example, not shown here), the cow then being held in the desired milking position by the stanchion members. The front end of the stall is generally provided with a feed trough readily accessible to the cow when she is in the position illustrated.

In order to support the milker in operative position beneath the cow, a supporting arrangement is provided on one side of the stall. In the particular embodiment illustrated here a supporting carriage element 15 is carried by and slidably movable on the longitudinal rods 11b and 11c. Any horizontal movement of this element 15 is merely for general adjustment for different types, sizes and breadths of cows, this element being stationary during milking and being here termed a "stationary" element, since it is so for all operative purposes during any given milking operation. The element 15 is a channel member having the toothed rack element 16 vertically slidable therein. Desired vertical positioning of this element 16 is effected by a pinion meshed therewith (said pinion not being shown here, since it is fully shown and described in said Reissue Patent 22,368) adapted to be manually rotated by a crank 17. Appropriate locking means are provided for holding the parts in any desired position to which they may be adjusted.

As may be best seen in Figure 3, a supporting member or swinging arm 18 is pivotally carried by the lower end of the element 16, so that the arm 18 is swung about a vertical axis. The supporting member is here shown as comprising an upper spring steel rod member 18a having a milker-carrying member 25 pivotally mounted in the end thereof and adapted to be hooked into a notch in the handle 19a of the milker 19; and a lower supporting and pull connecting rod 18c. Both of these rods are rigidly fastened in a bearing portion 18d journalled on an appropriate rod portion at the lower end of the rack element 16. The use of a resilient or spring metal supporting arm enables a certain amount of upward and downward springing of the outer end or milker-carrying portion so that, when the appropriate forward pull is exerted on the supporting member, the surging action of the milker 19 results in an intermittent downward and forward pull or tugging action of desired character. The milker is operated, in conventional manner, by air moving through the vacuum hose 19b, best seen in Figure 1.

In order to effect the desired forward pull on the supporting member, I am here showing a gravity-operated means connected to such member. This comprises a weight 20 which is vertically movable, here being shown as supported by a cable or rope 21 passing over the wheel of a pulley 22 and extending back toward the supporting member, it being understood that the connecting means between the weight and supporting member may be of any appropriate type, not being limited to the rope shown. In order to enable adjustment of the amount of forward pull exerted on the udder during milking, it is desirable to have the weight 20 capable of exerting different forces upon the supporting member 18, and this is here accomplished by providing different points of connection to such member. As may be best seen in Figure 3, the rod member 18c carries three downwardly extending studs 23a—c; and the rope 21 is provided with a loop 21a adapted to be looped over any desired one of these studs, it being shown looped over or connected to the stud 23b. It will be apparent that the point of connection is thus readily variable, it being necessary only to remove the loop from one stud and slip it over another stud; and that connection of the rope to the stud 23a will provide a greater forward pull on the milker, while connecting the rope to the stud 23c will provide a lesser pull than is exerted by the rope in the position illustrated, with the loop over the stud 23b. In order to limit the downward movement of the weight 20, the rope may be continued on back and fastened to the rod 11c, as shown in solid lines in Figure 2.

The present arrangement is particularly advantageous in that the amount of pull exerted on the udder by the milker is maintained substantially constant (speaking of the average pull, as distinguished from the perpendicular surging action) despite incidental movements of the cow during milking. The stanchion arrangement cannot be made so tight as to prevent all longitudinal movement of the cow, and a certain amount of forward and backward movement is permissible and is sometimes taken advantage of by a restless cow. With the spring biasing arrangement shown in Reissue Patent 22,368, backward movement of the cow tended to increase the pulling force above the desired value, whereas if the cow crowded clear up to the front of the stall, the pull might be reduced to the point where considerable milker efficiency was lost. With the present arrangement, however, there is substantially no variation in the forward pull exerted on the milker by the weight 20 during variations in position of the supporting arm 18 through a range of 30° to 40° forward and backward movement from a position perpendicular to the rods 11a—c, so that incidental forward and backward movements of the cow during milking do not tend to pull the cups off the teats, or to reduce the force to a point where considerable efficiency in the milking is lost.

The carrying member, here indicated in general as 25, may be best seen in Figures 4 and 5. The upper portion of this member is relatively narrow (as may be best seen in Figure 5) and generally yoke-shaped (as may be best seen in Figure 4); and it is formed with a stud portion 25a received in an opening in the outer or swinging end of the arm 18a (as may be best seen in Figure 3). The stud portion pivots relatively freely in the opening in the supporting arm, so that the carrying member 25 may twist and turn to maintain its optimum relationship to the milker during movements of the latter. During milking the cow sometimes shifts her position in the parlor stall; certain udders require the milker to beat an angle to equalize the pull on the teat cups; and when the milker is first hung on the supporting arm and then swung in under the cow, rotational movement of the milker takes place. All of these rotational movements have heretofore caused difficulty and frequently caused the supporting member to slip out of the notch in the milker handle. The use of the yoke-shaped pivoted carrying member here disclosed obviates these difficulties and maintains firm carrying relationship with the notch despite rotational movement of the milker for any reason, while still permitting it to have free fore and aft swinging movement, and to be readily shifted from one notch in the handle to another notch (see Figure 1) to adjust the amount of pull for various cows.

As may be best seen in Figure 4, the yoke-shaped member 25b has divergent outwardly extending arms providing an upper space which would be regularly curved except for the provision of a central upwardly extending protuberance 25c. The extending arms on each side maintain the handle in the desired position shown in Figure 4; and the upwardly extending protuberance extends into the notch and at least partly into an opening punched in the handle at that point, and provides a firm engagement with the handle. The result is a greatly improved carrying connection with the milker handle.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Apparatus of the character described for supporting a suspended milker in operative relation to an animal being milked, comprising: a stationary supporting element; a horizontally movable supporting member mounted on said element and adapted to carry the milker; force-applying means spaced from said supporting member for urging said member in a desired direction; and a connecting member attached to said force-applying means and said supporting member, said connecting member being attached to said supporting member at a point, and extending therefrom in a direction, such that the force exerted on the milker will be relatively unaffected by movement of the supporting member within the normal operating range thereof.

2. Apparatus of the character described for supporting a suspended milker in operative relation to an animal being milked, comprising: a stationary supporting element; a horizontally movable supporting member mounted on said element and adapted to carry the milker; force-applying means spaced from said supporting member for urging said member in a desired direction; and a connecting member attached to said force-applying means and to one of a plurality of points on said supporting member, said connecting member being normally positioned at an angle approximately 90° to the longitudinal axis of said supporting member so that the force thereon will be relatively unaffected by movement of the supporting member within the normal operating range thereof.

3. Apparatus of the character described for supporting a suspended milker in operative relation to an animal being milked, comprising: a stationary supporting element; a horizontally movable supporting member for carrying the milker and mounted on said element to pivot about a substantially vertical axis; force-applying means spaced from said member and located forwardly of the animal; a connecting member attached to said force-applying means and to said supporting member, said connecting member being positioned at a relatively large angle to the longitudinal axis of said supporting member so that the force thereon will be relatively unaffected by movement of the supporting member within the normal operating range thereof.

4. Apparatus of the character described for supporting a suspended milker in operative relation to an animal being milked, comprising: a stationary supporting element; a horizontally movable supporting member for carrying the milker and mounted on said element to pivot about a substantially vertical axis; a gravity urged weight spaced from said member and located forwardly of the animal; a flexible connecting member attached to said weight passing upwardly therefrom and then rearwardly to a connecting point on said supporting member, said connecting member being positioned at a relatively large angle to the longitudinal axis of said supporting member so that the force applied thereto by said weight will be relatively unaffected by movement of the supporting member within the operating range thereof.

5. In a milker apparatus comprising a milker having a handle thereon with a notch provided on the bottom surface of the handle and a supporting element, a member on the supporting element adapted to be engaged by the handle comprising: an upwardly-extending part pivoted to said member and having a portion for engaging said notch.

6. In a milker apparatus comprising a milker having a handle thereon with a notch provided on the bottom surface of the handle and a supporting element, a member on the supporting element adapted to be engaged by the handle comprising: an upwardly-extending part pivoted to said member about a substantially vertical axis and having a portion for engaging said notch, said axis intersecting the area of the upwardly-extending part that is adapted to be engaged by said handle.

7. In a milker apparatus comprising a milker having a handle thereon with a notch provided on the bottom surface of the handle and a supporting element, a member on the supporting element adapted to be engaged by the handle for supporting the milker and comprising: an upwardly-extending part pivoted to said member having spaced arms adapted to be arranged on opposite sides of the handle and a central portion for engaging the notch.

8. In a milker apparatus comprising a milker having a handle thereon with a notch provided on the bottom surface of the handle and a supporting element, a member on the supporting element adapted to be engaged by the handle for supporting the milker and comprising: an upwardly-extending part comprising a bottom portion rotatably engaging said member and rotatable about a substantially vertical axis, a pair of spaced upwardly-extending diverging arms on said bottom portion for arrangement on opposite sides of the handle, and an upwardly-extending central protuberance arranged between said arm at the bottom thereof for engaging said notch, said axis of rotation passing through said bottom portion and said protuberance.

HENRY B. BABSON.

REFERENCES CITED

The following references are of record in the file of this patent:

UNITED STATES PATENTS

| Number | Name | Date |
| --- | --- | --- |
| Re. 22,368 | Babson et al. | Aug. 24, 1943 |
| 74,507 | Colvin | Feb. 18, 1868 |
| 198,362 | Durand | Dec. 18, 1877 |
| 514,551 | Hussey | Feb. 13, 1894 |
| 594,860 | Cushman | Dec. 7, 1897 |
| 612,172 | McKelvey | Oct. 11, 1898 |
| 623,189 | Smith | Apr. 18, 1899 |
| 798,608 | Hoover | Sept. 5, 1905 |
| 1,859,213 | McCornack | May 17, 1932 |
| 1,930,606 | Bousfield | Oct. 17, 1933 |
| 2,198,048 | Babson et al. | Apr. 23, 1940 |